US 12,348,561 B1

(12) United States Patent
Liu

(10) Patent No.: US 12,348,561 B1
(45) Date of Patent: *Jul. 1, 2025

(54) DETECTION OF PHISHING ATTACKS USING SIMILARITY ANALYSIS

(71) Applicant: FireEye Security Holdings US LLC, San Jose, CA (US)

(72) Inventor: Rundong Liu, Santa Clara, CA (US)

(73) Assignee: Musarubra US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,682

(22) Filed: Jan. 30, 2023

Related U.S. Application Data

(63) Continuation of application No. 17/157,968, filed on Jan. 25, 2021, now Pat. No. 11,570,211, which is a continuation of application No. 15/469,400, filed on Mar. 24, 2017, now Pat. No. 10,904,286.

(51) Int. Cl.
| | | |
|---|---|---|
| H04L 29/06 | (2006.01) | |
| H04L 9/32 | (2006.01) | |
| H04L 9/40 | (2022.01) | |

(52) U.S. Cl.
CPC ........ H04L 63/1483 (2013.01); H04L 9/3236 (2013.01)

(58) Field of Classification Search
CPC .......................... H04L 63/1483; H04L 9/3236
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |

(Continued)

FOREIGN PATENT DOCUMENTS

| | | |
|---|---|---|
| GB | 2439806 A | 1/2008 |
| GB | 2490431 B | 3/2014 |

(Continued)

OTHER PUBLICATIONS

Zhou et al., "Visual Similarity Based Anti-phishing with the Combination of Local and Global Features", 2014 IEEE 13th International Conference on Trust, Security and Privacy in Computing and Communications, Date of Conference: Sep. 24-26, 2014).*

(Continued)

*Primary Examiner* — Morshed Mehedi
(74) *Attorney, Agent, or Firm* — Rutan & Tucker, LLP

(57) ABSTRACT

A computerized system and method to detect phishing cyber-attacks is described. The approach entails analyzing one or more displayable images of a webpage referenced by a URL to ascertain whether the one or more displayable images, and thus the webpage and potentially an email including the URL, are part of a phishing cyber-attack.

23 Claims, 3 Drawing Sheets

(56) References Cited

U.S. PATENT DOCUMENTS

| | | |
|---|---|---|
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,840,724 B2 | 11/2010 | Nishiyama |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,438,642 B2 | 5/2013 | Feng et al. |
| 8,448,245 B2 * | 5/2013 | Banerjee .............. G06F 21/51 709/224 |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |

(56) References Cited

U.S. PATENT DOCUMENTS

| | | |
|---|---|---|
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Smael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,628,805 B2 * | 4/2017 | Smarda ................. G06F 21/564 |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |

(56) References Cited

U.S. PATENT DOCUMENTS

| | | |
|---|---|---|
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,163,105 B1 * | 12/2018 | Ziraknejad ......... G06Q 20/3274 |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,904,286 B1 * | 1/2021 | Liu ....................... H04L 9/3236 |
| 11,570,211 B1 | 1/2023 | Liu |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0172421 A1 | 11/2002 | Kondo et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |

(56) References Cited

U.S. PATENT DOCUMENTS

| | | |
|---|---|---|
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0212899 A1* | 9/2008 | Gokturk ............ G06Q 30/0603 382/305 |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2010/0313266 A1 | 12/2010 | Feng et al. |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |

(56) References Cited

U.S. PATENT DOCUMENTS

| | | |
|---|---|---|
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1* | 4/2015 | Ismael .................. G06F 21/566 726/23 |
| 2015/0163242 A1 | 6/2015 | Laidlaw et al. |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0213251 A1 | 7/2015 | Turgeman |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0099140 A1 | 4/2017 | Hoy et al. |
| 2017/0206691 A1* | 7/2017 | Harrises ............. G02B 27/0172 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Mining Specification of Malicious Behavior"—Jha et al., UCSB, Sep. 2007 https://www.cs.ucsb.edu/.about.chris/research/doc/esec07.sub .--mining.pdf-.

"Network Security: NetDetector-Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.iso?reload=true&arnumber=990073, (Dec.7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye") (Sep. 2003),.

Afroz et al., "PhishZoo: Detecting Phishing Websites by Looking at Them", 2011 IEEE Fifth International Conference on Semantic Computing, Date of Conference: Sep. 18-21, 2011).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlaq Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005

(56) References Cited

OTHER PUBLICATIONS

ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al., Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Placek, and Timothy N. Newsham , "Insertion, Evasion, and Denial of Service:Detection", Secure Networks, ("Ptacek"), (Jan. 1998).
U.S. Appl. No. 15/469,400, filed Mar. 24, 2017 Final Office Action dated Apr. 17, 2020.
U.S. Appl. No. 15/469,400, filed Mar. 24, 2017 Final Office Action dated May 22, 2019.
U.S. Appl. No. 15/469,400, filed Mar. 24, 2017 Non-Final Office Action dated Nov. 6, 2018.
U.S. Appl. No. 15/469,400, filed Mar. 24, 2017 Non-Final Office Action dated Sep. 9, 2019.
U.S. Appl. No. 15/469,400, filed Mar. 24, 2017 Notice of Allowance dated Oct. 8, 2020.
U.S. Appl. No. 17/157,968, filed Jan. 25, 2021 Non-Final Office Action dated Aug. 26, 2022.
U.S. Appl. No. 17/157,968, filed Jan. 25, 2021 Notice of Allowance dated Sep. 21, 2022.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.

(56) References Cited

OTHER PUBLICATIONS

Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al.: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., "Cantina: a content-based approach to detecting phishing web sites", WWW '07: Proceedings of the 16th International conference on World Wide Web, May (Year: 2007).
Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

DETECTION OF PHISHING ATTACKS USING SIMILARITY ANALYSIS

CROSS-REFERENCE TO RELATED APPLICATIONS

The present application is a continuation of U.S. patent application Ser. No. 15/469,400 filed Mar. 24, 2017, now U.S. Pat. No. 10,904,286 issued Jan. 26, 2021, the entire contents of which are incorporated by reference herein.

FIELD

Embodiments of the disclosure relate to the field of cyber security. More specifically, embodiments of the disclosure relate to a system for detecting phishing attacks.

BACKGROUND OF THE INVENTION

Phishing is a growing problem on the Internet. Phishing is the attempt to obtain sensitive information from targets by disguising requests as legitimate. A phishing attack can entail the transmission of an electronic communication, such as an email, to one or more recipients that purports to be from a known institution, such as a bank or credit card company, and seems to have a legitimate intention; however, the email is actually intended to deceive the recipient into sharing its sensitive information. Often the email draws the recipient to a counterfeit version of the institution's webpage designed to elicit the sensitive information, such as the recipient's username, password, etc.

For example, a malware author may transmit an email to a recipient purporting to be from a financial institution and asserting that a password change is required to maintain access to the recipient's account. The email includes a Uniform Resource Locator (URL) that directs the recipients to a counterfeit version of the institution's website requesting the recipient to enter sensitive information in a displayed form in order to change the recipient's password. Neither the email nor the URL are associated with the actual financial institution or its genuine website, although the email and the counterfeit website may have an official "look and feel" and imitate a genuine email and website of the institution. The phishing attack is completed when the recipient of the email enters and submits sensitive information to the website, which is then delivered to the malware author.

Current solutions for phishing detection include textual search and analysis of emails and image similarity analysis of the entirety of a displayed webpage. These solutions can be highly compute resource intensive and too often fail to detect phishing attacks. A new phishing detection technique is needed to more efficiently, efficaciously, and reliably detect phishing cyber-security attacks of this type.

BRIEF DESCRIPTION OF DRAWINGS

Embodiments of this disclosure are illustrated by way of example and not by way of limitation in the figures of the accompanying drawings, in which like references indicate similar elements and in which.

DETAILED DESCRIPTION

Figure 1:
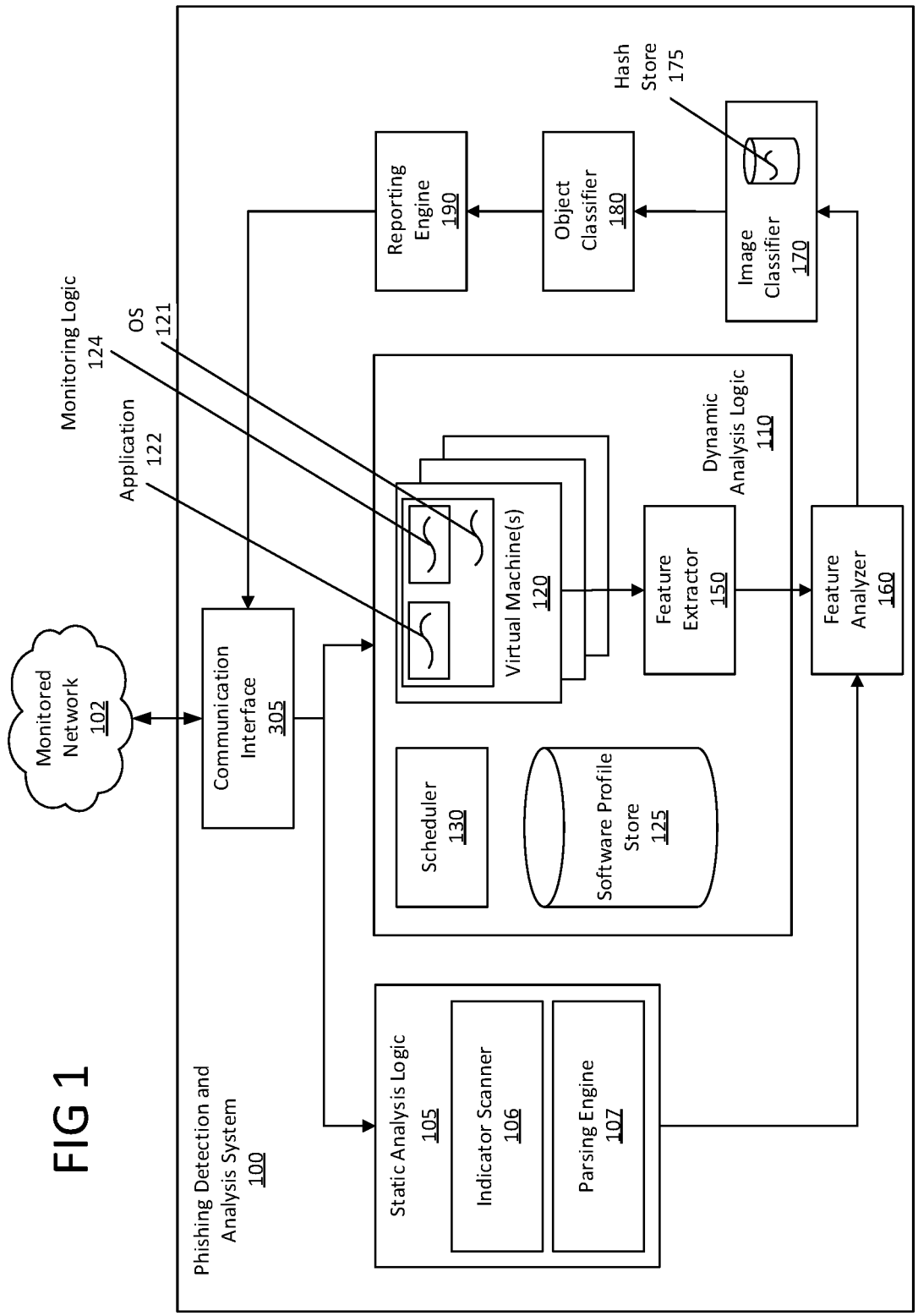
FIG. 1 is an exemplary block diagram of an architecture comprising a phishing detection and analysis system (PDAS) according to an embodiment of the invention.

A phishing attack detection technique is provided to enhance the detection of a cyber-attack initiated via an electronic message (e.g. email, Short Message Service "SMS", etc.) with a displayable hyperlink, e.g., a Uniform Resource Locator ("URL"). The enhanced phishing detection technique is configured to: (i) receive an object such as a webpage indicated (referenced) by a URL extracted from an email, (ii) statically and/or dynamically analyze the object to determine whether the object exhibits features (e.g., existence of any displayable images such as a user form or other user input prompt contained in the object) that are of a suspicious nature in that they are associated with known phishing attacks, (iii) extract each of the images included in the suspicious object which may be associated with phishing attacks, and generate properties (e.g., image pixel height and width or aspect ratio) associated with each such image, (iv) correlate the extracted image properties with image properties of known phishing and/or known benign webpages to classify the object, and (v) generate and issue an alert to a network administrator to indicate a classification of the object as part of a phishing attack.

More specifically, the enhanced detection technique embodied in the phishing detection analysis system receives an object for processing to determine whether the object is part of a phishing attack. The received object may include the webpage content or reference the webpage with a URL. The webpage content associated with the URL (i.e. the source code and associated data) is retrieved (e.g., downloaded) directly or indirectly from a remote webserver indicated by the URL. The webpage content comprises source code, which can be, for example, static source code, e.g. HTML code of the downloaded webpage, and/or dynamic source code, that is, HTML code generated from JavaScript code and the like during run-time.

The phishing detection and analysis system ("PDAS") employs static analysis to scan (inspect) the source code of the received webpage content to detect whether any input prompt (e.g., a form such as a "fill in the blank" displayable element or other data-submission element) are included in the code. The input prompt represents one or more features associated with a potential phishing page, and may be used to correlate with the features of known phishing websites. If there are no input prompts detected by the phishing detection and analysis system, the system does not perform further analysis as the page likely is not used to extract credentials or other sensitive information from the recipient of the webpage. If one or more input prompts are detected during this initial processing of the webpage, the phishing detection and analysis system proceeds to extract the images of the webpage and generate properties associated therewith to be used in classifying the image. The image extracted from the object may include a graphical representation of a subset of the displayed webpage, separately defined graphical representations included in the object, and/or a plurality of the graphical representations defined.

Additional features extracted by the PDAS and associated with the URL being analyzed may include one or more properties associated with each of the embedded images (e.g., a logo, virtual, displayable keyboards, background images, security images, etc.)

extracted from the received webpage as well the URL itself. For instance, the PDAS may determine the height and width associated with an image, or in some embodiments, may extract the aspect ratio (i.e. a comparison of the height and width of the image). The PDAS may also generate a cryptographic hash using a cryptographic hashing function (e.g., MD5, SHA2, etc.) of each image which may be used to determine "identicalness" while a second, perceptual hash, may be generated to be used to determine the similarity of the image to images associated with benign to phishing pages.

For each image associated with the object, a set of the image properties are generated for comparison with properties of known phishing and/or benign webpages. Each image of a webpage is analyzed separately and then each may be correlated separately with properties of known phishing and/or benign webpages, or, depending on the embodiment, the properties across a set of images extracted from the object may be so correlated. More specifically, in one embodiment, each property of an image is correlated with properties of known phishing images and assigned a score based on the correlation. The scores for the various properties are combined to produce an overall or composite score for the image ("image score"). If the image score exceeds a threshold, the image may be determined to be related to a phishing cyber-attack. The image score is a measure of "phishiness" of the image. For example, in this embodiment, if the perceptual hash of a single image on a webpage is associated with phishing while other properties of the image (e.g., the MD5 and aspect ratio) are not correlated with phishing, the entire image may be determined not be associated with a phishing cyber-attack, as reflected in the image score. Meanwhile, in another embodiment, if the perceptual hash similarity is determined to be above a threshold, irrespective of the correlation of the image's other properties with those of a phishing attack, the image may be determined to be associated with a phishing cyber-attack.

Once each image is processed by the PDAS to determine its correlation with known phishing cyber-attacks and thus associated with an image score, the PDAS determines the likelihood that the entire object (i.e., webpage) is related to a phishing attack by generating an object score. The object score can be computed by combining quantitatively the image scores for the images in the object. In some embodiments, a more complicated computation can be used based on a plurality of factors weighted by the image scores, where the factors may include the ratio of displayable image area to the entire displayable area of the webpage (object), and/or quantity of phishy images relative to the entire number of images in the webpage. If the resulting object score exceeds a threshold, the webpage is determined to be part of a phishing cyber-attack and an alert is issued.

The enhanced phishing cyber-attack detection technique described herein enhances the detection of phishing cyber-attacks related to objects analyzed by the system using the images embedded in the object. By analyzing the features of the images associated with the object, the system may detect phishing attacks efficiently, limiting the need for increased compute resources and enabling broader protection.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be comprised of one or more threads executing concurrently (e.g., each thread may be executing the same or a different instruction concurrently).

The term "processing" may include execution of a binary or script, or launching an application in which an object is processed, wherein launching should be interpreted as placing the application in an open state and, in some implementations, performing simulations of actions typical of human interactions with the application. For example, the application, an internet browsing application, may be processed such that the application is opened and actions such as "visiting" a website, downloading website pages, scrolling the website page, and activating a link from the website are performed.

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected characteristics and, during processing, a set of expected and/or unexpected behaviors, which may evidence the presence of malware and/or potentially part of a cyber-attack. For example, an unexpected behavior of an object may include the generation of additional objects by an object being processed. In one embodiment, an object may include a binary file that may be executed within a virtual machine. Herein, the terms "binary file" and "binary" will be used interchangeably.

The term "feature" may be understood to refer, collectively, to the characteristics of an object detected during static analysis, behaviors manifested during dynamic analysis in response to the run-time processing of (e.g., executing) an object, and properties of the object generated during analysis. For example, characteristics may include metadata associated with the object, including, anomalous formatting or structuring associated with the object. Behaviors may include, but are not limited to, an activity such as creation of a displayable user interaction form and/or patterns of activity or inactivity. Properties are discussed at some length below.

The term "network device" may be construed as any intelligent electronic device with the capability of connecting to a network. Such a network may be a public network such as the internet or a private network such as a wireless data telecommunication network, wide area network, a type of local area network (LAN), or a combination of networks. Examples of a network device may include, but are not limited or restricted to a network appliance, laptop, mobile phone, or server.

The term "phishing," as described above, may be understood as the practice of inducing individuals to reveal personal or other sensitive information, such as passwords and credit card numbers, by imitating another, often trusted, party. Phishing cyber-attacks are typically disguised as legitimate requests from a trusted party, a "target," which appears to be legitimate; however, the email is intended to deceive the recipient into sharing sensitive information. For example, an email requesting credential information may be sent to a recipient implying it is from a bank. In this example the recipient is subject to a phishing cyber-attack from the sender imitating the bank.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. Phishing Detection and Analysis System

FIG. 1 is an exemplary block diagram of an exemplary architecture of a phishing detection and analysis system 100 (PDAS) connected to a monitored network 102. The PDAS 100 comprises at least a dynamic analysis logic 110 and, in some embodiments, may also comprise a static analysis logic 105. In some embodiments the dynamic analysis logic 110 may further comprise at least one or more virtual machine(s) 120, each virtual machine configured with an operating system 121 (OS), one or more applications 122, and monitoring logic 124, as well as a feature extractor 150. Still further embodiments of the PDAS may also comprise a scheduler 130 and a software profile store 125.

Figure 3:
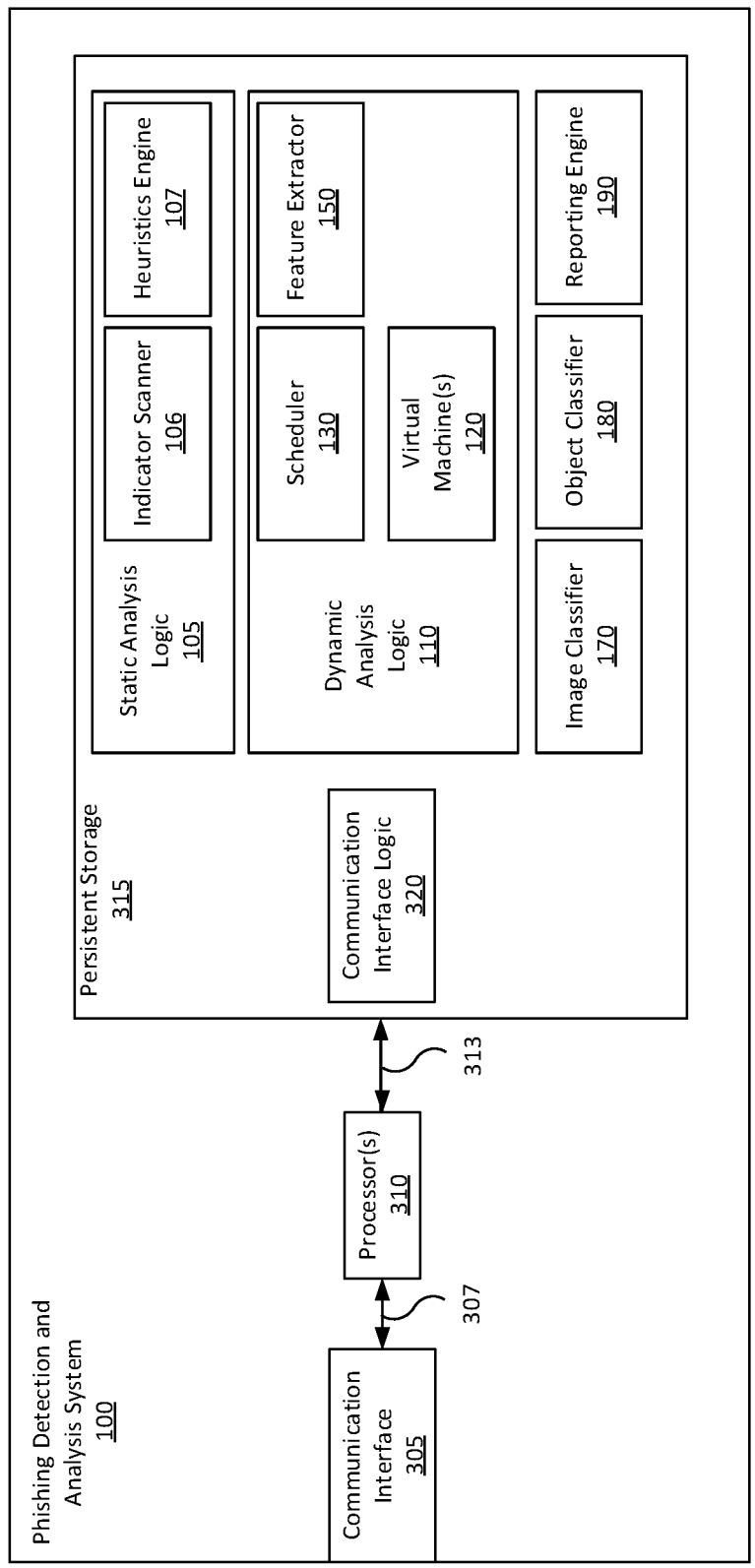
FIG. 3 is an exemplary embodiment of a logical representation of the phishing detection and analysis system of FIG. 1.

Generally speaking, the phishing detection and analysis system (PDAS) 100 may be implemented as one or more network-connected electronic devices, where each includes physical hardware comprising hardware processor(s), network interface(s), a memory, and a system interconnect as shown in FIG. 3. Accordingly, each of the components of the phishing detection and analysis system 100 shown in FIG. 1 and described below may be implemented as one or more computer programs or modules executable on one or more processors and stored in memory.

The PDAS 100 receives objects for analysis via the communication interface 305 and determines if the received object is phishy (i.e. is a part of or otherwise associated with a phishing cyber-attack). In some embodiments, the PDAS may analyze the objects using a static analysis logic 105 configured to extract characteristics of the object and determine whether the object is phishy by scanning for known patterns or characteristics and/or representations of machine code identified as correlating with the features of phishing cyber-attacks. In some embodiments the PDAS may retrieve the object from a network-connected object store for analysis. For example, an email may contain a URL that references a webpage, which is retrieved by the PDAS 100 from the object store. The object store may contain pre-downloaded webpages frequently used in phishing attacks, or may be connected with a browser facility for downloading the webpages dynamically during analysis, e.g., in response to a request from the PDAS. If the static analysis logic determines the object is suspicious (definitively neither "benign" nor "malicious"), the static analysis logic may provide the suspicious object to a scheduler 130 of the dynamic analysis logic 110 for further analysis.

The static analysis logic 105 may comprise an indicator scanner 106 which receives features associated with each object and compares it with unique indicators. The unique indicators are each associated with a previously encountered object known to be "benign" or "phishing". In some embodiments, the indicator scanner 106 may be configured with a whitelist (indicators determined to be benign) and a blacklist (indicators determined to be associated with phishing cyber-attacks). The indicator scanner 106 may effect a comparison by generating the unique indicator of the object from a hash of its machine code or other characteristics of the object and comparing the hash to the labelled hashes (e.g. of a set of known phishing or benign objects). In some embodiments, if the object is deemed suspicious and/or cannot be determined to be either benign or phishing, the static analysis logic may direct continued processing of the object by the parsing engine 107 of the static analysis logic 105.

The parsing engine 107 may process the received content and determine whether the content contains hallmarks associated with phishing cyber-attacks, for example, by prompting for user input. The parsing engine 107 may analyze the received content for textual cues associated with cyber-attacks (e.g. text displayed to the user requesting sensitive personal information such as credentials, etc.) In some embodiments the parsing engine 107 may also examine the received content to determine whether there are elements associated with user input (e.g. form elements for inputting "passwords", etc.) and data submission (e.g. JavaScript code implementing form submission). The parsing engine 107 of the static analysis logic 105 processes the source code of the object using syntactic analysis. The parsing engine 107 processes the object and its source code to determine whether it contains characteristics of phishing cyber-attacks. For example, the parsing engine may receive the source code associated with an object, which may be received from linked websites (e.g. by Cascading Style Sheets referencing remote images for inclusion in the webpage) and using syntactic analysis identify the use of elements (e.g., particular HTML source code) intended to obtain user input. The identification of features associated with phishing cyber-attacks is an important preliminary indicator of a phishing cyber-attack. The parsing engine 107 may utilize heuristics to analyze the source code of the object and identify properties of interest. If characteristics associated with a phishing cyber-attack are identified by the parsing engine 107 of the static analysis logic 105 the parsing engine may extract further characteristics associated with portions of the object.

The parsing engine 107 may determine that objects are embedded and/or associated with the object (e.g. the image may reference a third party website) and for each image the parsing engine would generate a set of properties associated with the image. The set of properties for the image may comprise the dimensions of the object (e.g. height and width and/or the aspect ratio of the image), a cryptographic hash (e.g., an MD5, etc.) of the image generated by the parsing engine, and a perceptual hash (i.e. a fingerprint of the image derived from features of its content) of the image similarly generated by the parsing engine. In some embodiments the parsing engine may determine, from a semantic analysis of the source code, the target of the object phishing attack (i.e. the entity such as the above mentioned financial institution that is imitated). The set of images and their associated characteristics will be provided to the feature analyzer 160.

The dynamic analysis logic 110 of the phishing detection and analysis system (PDAS) 100, comprises at least one or more virtual machine(s) 120, a software profile store 125, a scheduler 130, and a feature extractor 150. Each virtual machine is configured with an operating system 121, one or more applications 122, and a monitoring logic 124 to intercept activities of the one or more applications during execution while processing of the object. In some embodiments the scheduler 130 is configured to receive an object, from the static analysis logic 105, to be scheduled for processing by the one or more virtual machines 120. The object may be provided to the system with metadata indicating the object has been identified by a prior analysis as suspicious. In other embodiments the scheduler 130 may be configured to process received objects based on the available processing resources of the PDAS 100.

The scheduler 130 is responsible for provisioning and instantiating a virtual machine 120 to execute the object at a schedule time. The scheduler 130 may receive suspicious objects from the malware detection system 105 for analysis in the virtual machine 120. The scheduler 130 may provision a virtual machine 120 with a software profile indicated by the type of object, e.g., an email requires an email application and a URL may require a web browser. In some embodiments, the scheduler may receive metadata associated with the object to be processed identifying a destination device to the scheduler 130. The scheduler may use network resources to identify a software profile similar to the destination device. The scheduler 130 may then provision one or more virtual machine(s) 120 with a software profile (operating system (OS) 121 and one or more applications 122) retrieved from the software profile store 125 and other components appropriate for execution of the object. A virtual machine is executable software that is configured to mimic the performance of a device (e.g., the destination device).

The scheduler 130 can configure the virtual machine to mimic the performance characteristics of a destination device that are pertinent for behavioral monitoring for malware detection. The virtual machine 120 can be provisioned from the store of software profiles 125. In one example, the scheduler 130 configures the characteristics of the virtual machine to mimic only those features (which include statically detected characteristics and dynamically monitored behaviors) that are affected by an object to be executed (opened, loaded, and/or executed) and analyzed. Such features can include ports that are to receive the network data, select device drivers that are to respond to the network data and any other devices that could be coupled to or contained within a device that can respond to the network data.

The store of software profiles 125 is configured to store virtual machine images. The store of software profiles 125 can be any storage capable of storing software. In one example, the store of software profiles 125 stores a single virtual machine image that can be configured by the scheduler 130 to mimic the performance of any destination device on the network. The store of software profiles 125 can store any number of distinct virtual machine images that can be configured to simulate the performance of any destination devices when processed in one or more virtual machine(s) 120.

The processing of an object may occur within one or more virtual machine(s) 120, which may be provisioned with one or more software profiles. The software profile may be configured in response to configuration information provided by the scheduler 130, information extracted from the metadata associated with the object, and/or a default analysis software profile. Each software profile may include an operating system 121 and/or software applications 122. The application 122 may receive an object directly (e.g. an HTML formatted email containing fields for entry of sensitive information, a URL of a webpage enabling a user to submit sensitive user information, etc.). In some embodiments the application 122 may comprise a browser and/or an email client.

Each of the one or more virtual machine(s) 120 may be configured with monitoring logic 124, as part of the software profile. The monitoring logic 124 is configured to observe, capture and report information regarding run-time behavior of an object under analysis during processing within the virtual machine. For example, an object processed by the virtual machine logic may display dynamically generated content, prompting data input by a user. The monitoring logic 124 may identify this dynamically generated content and provide information associated with the behavior to the feature extractor 150. The feature extractor 150 may determine based on the received behavioral information further data should be extracted and provided to the feature analyzer (i.e. if an object prompts for user input, the feature extractor may determine this may be indicative of a phishing cyberattack and extract all images associated with the object for further analysis).

The monitoring logic 124 of the virtual machine(s) 120 processing the object may identify behaviors (i.e. "observed behaviors") associated with the object. The observed behaviors are features of the object. Additionally, the effects on the virtual machine caused by the object's operation may be recorded as meta-information. During classification, features may be coupled with meta-information to classify the object processed, as part of a phishing cyber-attack.

The monitoring logic 124 may be embedded to monitor activities within the virtual machine 120 and/or otherwise integrated into the PDAS 100 to monitor operation of the one or more applications 122 of the virtual machine. In some cases, where the object is written in a scripting language or may generate a related object in a scripting language, the application 122 may comprise at least one interpreter to process the suspicious object script and/or an object script generated by processing an object by the application.

In some embodiments, the monitoring logic 124 intercepts behaviors during execution of the application 122 processing an object. The monitoring logic 124 is configured to determine when the user is prompted for data input during processing of an object. The monitoring logic may determine when a user is prompted for input based on syntactic analysis of the code being processed and/or experiential learning.

During processing in the one or more virtual machine(s) 120, monitoring logic 124 of the virtual machine are configured to identify behaviors associated with the phishing cyber-attacks (e.g. credential and/or other user input fields). Signaling from an application 122 may be monitored through intercept points (sometimes referred to as "hooks") to certain software calls (e.g., Application Programming Interface "API" call, library, procedure, function, or system call). The operations of the application may be monitored an intercept point (herein sometimes referred to as "instrumentation") in code closely operating with the application to detect a certain type of activity, which may include an activity prompting a particular software call. In some embodiments, the monitoring logic may be embodied as hooks or instrumentation associated with calls to an operating system 121 function. The observed behavior associated with the processing of the object information as well as effects on the virtual machine along with other related metadata may be provided to the feature analyzer 150 for further processing.

A feature analyzer 150 may receive the monitored and detected features from the one or more virtual machine(s) 120. The feature analyzer 150 is configured to detect anomalous activity (e.g., unexpected, abnormal, etc.) indicating that each image associated with the object should be extracted for provision to the feature analyzer 160. The received features are processed by the feature extractor 150 in combination with the data stored in the feature extractor.

The feature extractor 150 may contain predefined definitions and/or rules that indicate features (i.e. behaviors) associated with phishing cyber-attacks. For example, during the processing of an object, a user input interface may be created to accept information, e.g., a username and password. The monitoring logic would generate an event in response to the user input interface creation and provide to the feature extractor 150. The feature extractor would consult a predefined set of rules which may indicate that the user input interface creation event may be associated with a phishing cyber-attack and, in response, the feature extractor would extract the images associated with the processing of the object in the virtual machine 120. The predefined definitions and/or rules may be continuously updated via software updates received via the cloud computing services (not shown) and/or via a network administrator.

The feature analyzer 160 receives the features object and images associated with the object, extracted during processing of the object by the static analysis logic 105 and the dynamic analysis logic 110. In some embodiments, the parsing engine 107 and the feature extractor 150 may generate a set of properties associated with each received image. In other embodiments, the images are received by the feature analyzer 160, combined on a per object basis and duplicates filtered out from further processing such that only images unique to the combined set have properties generated. For example, if the static analysis logic 105 extracts images "A" and "B" from a received object while the dynamic analysis logic extracts images "A", "B", and "C", each would be provided to the feature analyzer, before properties are generated, and one sample of images "A" and "B" would be removed such that only one set of properties of "A", "B" and "C" are generated. The set of images and associated generated properties are provided to the image classifier 170 for further analysis.

The image classifier 170 receives images from the feature analyzer 160. Each image is received with a set of associated generated properties which may include at least a hash of the image, a perceptual hash of the image contents and the dimensions, and/or aspect ratio) of the image. The image classifier may compare, using similarity analysis, the image phash with a set of known phishy phashes stored in a hash store 175. The hash store 175 may store cryptographic hashes and perceptual hashes associated with known benign and/or phishing attacks. During classification, the hashes contained within the hash store 175 may use various techniques (e.g., exact match, similarity analysis, etc.) to determine whether an image hash is associated with a known benign or phishing hash located in the store. The hash store may be a component of the PDAS 100 or located separately or even remotely, and connected to the PDAS 100 via a network connection. In some embodiments similarity analysis may be used to determine whether the image is correlated with a known phishy phash. The image will be determined to be phishy if the level of correlation of the image with known phishy images exceeds a threshold. In some embodiments the image score threshold may be static (e.g., pre-set by the manufacturer of the PDAS 100 or pre-configured by its custom)) or dynamic, varying in response to computer processor availability, information received via the communication interface 305 associated with the current frequency of attacks, and/or experiential learning associated with other factors. When the image classifier 170 determines an image is phishy in response to its correlation with known phishy images exceeding a threshold, the classification is added as a further property of the set of properties associated with the image. The procedure is repeated for each image received from the feature analyzer 160. When each image associated with the object is classified by the image classifier 170, the set of images and the associated generated properties are provided to the object classifier to determine whether the object is determined to represent a phishing cyber-attack.

The object classifier 180 receives from the image classifier 170 a set of images and associated generated properties related to the processing of the object. The object classifier 180 determines the phishiness (i.e. an object score) associated with the object based, at least in part, on the information provided by the image classifier 170. The object classifier 180 may determine an object score by further analyzing the image scores (level of correlation associated with each image) received in comparison to an object score threshold. The object score threshold (i.e. object score threshold) may be based on the total pixel area of images (when displayed) associated with the object determined to be phishy. In other embodiments, the object score threshold may be based on a ratio of phishy image area compared to non-phishy image areas. In still further embodiments, the object score threshold may be based on a ratio of the area of phishy images weighted by the associated image scores against the total area of images in the object. If the object score exceeds the object score threshold, the object classifier 180 determines the object to represent a phishing cyber-attack. When the object classifier 180 determines the phishiness of the object it provides the determination to the reporting engine 190 for alerting. In some embodiments the image classifier 170 and object classifier 180 may be functionally integrated into a single component.

The reporting engine 190 is adapted to receive information from the object classifier 180 and generate alerts that identify to a network administrator and/or an expert network analyst the likelihood of a phishing cyber-attack associated with the processed object. Other additional information regarding the phishing object may optionally be included in the alerts. For example, an alert may include information associated with the targeted recipient of the object and/or the "target" entity (e.g., financial institution) mimicked by the object.

Figure 2:
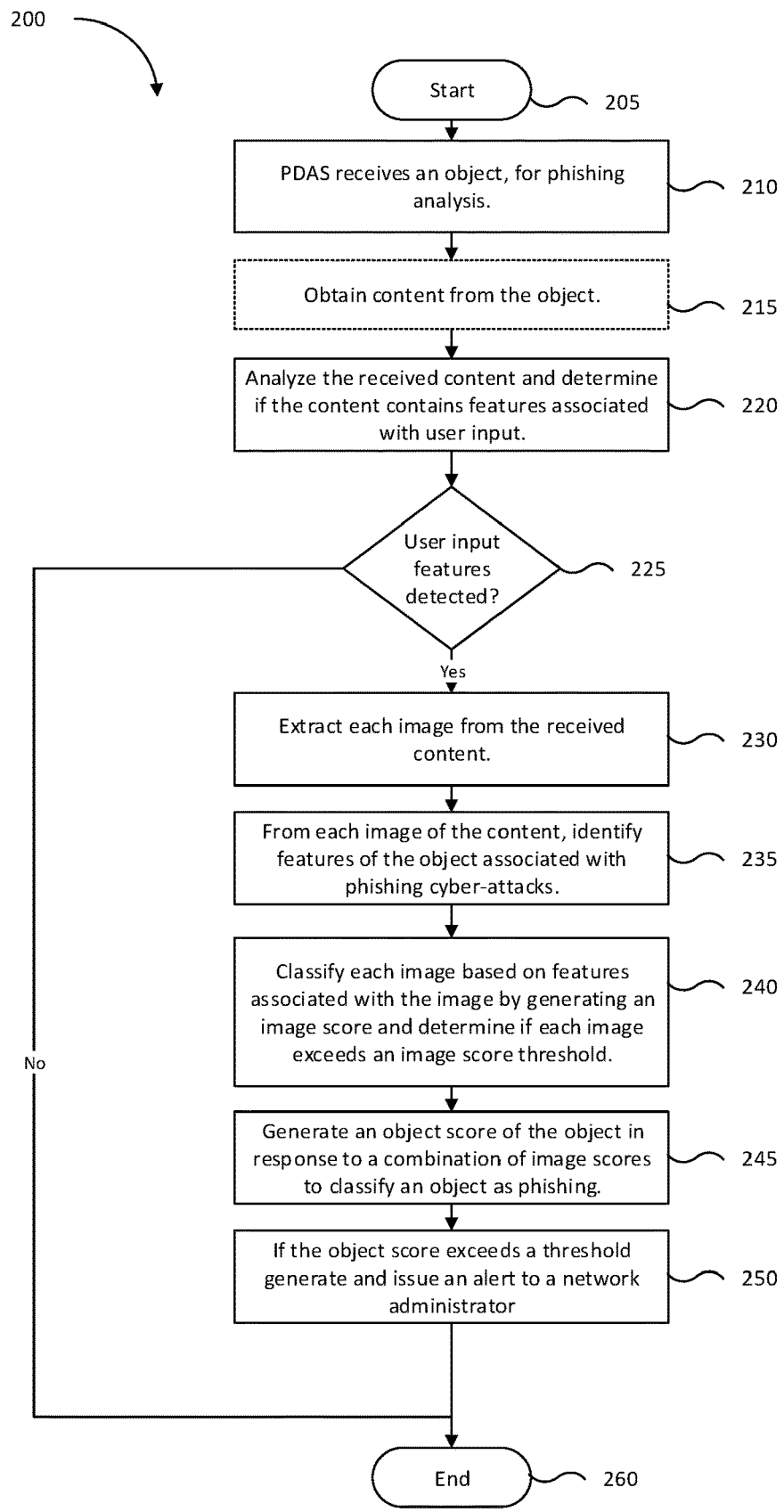
FIG. 2 is a flowchart illustrating an exemplary method for detecting and reporting if objects, received by the PDAS of FIG. 1, comprise a phishing cyber-attack.

Referring now to FIG. 2, a flowchart, illustrating an exemplary method for determining the phishiness (likelihood of being associated with phishing cyber-attacks) of an object received for analysis by the phishing detection and analysis system (PDAS) 100. Each block illustrated in FIG. 2 represents an operation performed in the method 200 of detecting phishing cyber-attacks with the PDAS 100. The method 200 starts at step 205 and proceeds to step 210 wherein the PDAS receives, via the communication interface 305 connected to the monitored network 102, an object for analysis. In some embodiments the monitored network 102 may be connected to a PDAS 100 that is hosted in a "cloud" and accessed for object analysis via remote network connection. The object may comprise a URL and/or content associated with a URL for determination if associated with a phishing cyber-attack. In some embodiments the PDAS 100 may receive the object for analysis from a monitored network 102 via the public network (i.e. the Internet) through the communication interface 305 to analyze objects for phishing cyber-attacks from a remote location. If the object for analysis has been received by the PDAS in step 210 comprises only a URL, the procedure advances to step 215 where the content associated with the URL is retrieved for analysis. Alternatively, if the object received by the PDAS in step 210 comprises the content for analysis (i.e. the source code of the URL and associated data), the procedure advances to step 220.

In step 215, the PDAS 100 retrieves the webpage source code associated with the received URL if in step 210 the PDAS receives a URL as an object. In various embodiments the PDAS 100 may retrieve the content via the public network, by intercepting network traffic over the monitored network 102, or from a network object store of the monitored network. When the PDAS has retrieved the content associated with the object (in step 210 or step 215) it will be processed by the static analysis logic 105 and/or the dynamic analysis logic 110 of the PDAS 100. The dynamic analysis logic may receive the network traffic associated with the object content, received in steps 210 and/or 215, so as to be received and processed as network traffic by the virtual machine(s) 120.

In step 220, the static analysis logic 105 and dynamic analysis logic 110 of the PDAS 100 process the content of the object to determine whether the object contains features associated with user input. The static analysis logic 105, while processing the object with a parsing engine 107 may determine whether the object contains features associated with user input. The parsing engine 107 receives the object for analysis and parses the source code for features associated with phishing cyber-attacks (e.g., user input fields, data upload elements, etc.) A user input feature of the object may be determined to be associated with user input based on analysis of the associated labels and content of the object and/or experiential data of the parsing engine 107. Similarly, a static analysis of the object may, in some embodiments, occur in the dynamic analysis logic 110, for example, with respect to images not able to be analyzed prior to execution of the source code of the webpage.

The dynamic analysis logic 110, in step 220, may receive the object for processing to determine whether the object contains features associated with user input. The object will be provided to the scheduler 130 of the dynamic analysis logic 110 for prioritization in an analysis queue in at least one of the virtual machine(s) 120. The scheduler will determine a suitable software profile to be selected from a software profile store 125 and used by the virtual machine(s) 120 to process the object. During processing of the object in the virtual machine 120 the monitoring logic 124 may identify features associated with user input. For example, an object processed in the virtual machine may launch a browser (i.e. an application 122) and navigate the window to a webpage containing at least a user input field. The monitoring logic would identify the existence of the user input field and the analysis procedure would proceed to step 230.

If during step 220 the static analysis logic 105 and/or the dynamic analysis logic 110 identifies features associated with data input, each respective logic will continue processing the object in step 230. If no user input features are detected in step 220 the analysis procedure will proceed to step 260 and end. In step 230, each analysis logic would extract the images associated with the object for further analysis. The static analysis logic 105 would extract the images associated with the object with the parsing logic 107, while similarly, the dynamic analysis logic would extract images for further analysis using the monitoring logic 124 coordinating with the feature extractor 150. The feature extractor 150 and the parsing engine 107 would provide the extracted images to the feature analyzer 160 for further processing in step 235.

In step 235, the feature analyzer 160 receives each image associated with the object and generates a set of properties associated with each image of the object. The properties generated by the feature analyzer 160 are used to determine phishiness of the object. In some embodiments, properties generated from the image may include the height and width of the image, the MD5 associated with the image, and/or a perceptual hash (i.e. a phash). The feature analyzer associates each image, its properties and the object target (e.g., a financial institution known to be often used in phishing attacks) and provides the set of properties to the image classifier 170 in step 240.

The image classifier 170, in step 240, receives associated properties for each image of the object and analyzes each image separately. The image classifier 170 compares the MD5 of the image with a store of known phishy MD5s, such as a hash store 175. The store of phishy MD5s may be updated via the communication interface 305, creating or removing entries associated with phishy MD5s as the threat landscape changes. Phishy MD5s are cryptographic hashes of files associated with phishing cyber-attacks. A phishiness is determined by experiential learning. If an MD5 entry for the image is not identified in the image MD5 store of the image classifier, the image classifier will compare the image phash with a phishy phash store. The phishy phash store contains entries associated with known phishy image phashes. In some embodiments, the phishy phash store and the phishy MD5 store may reside in the same store (i.e. a database of entries containing both phishy phashes and MD5s), separate stores, integrated into indicator store 145. The comparison of the image phash with those in the phishy phash store may result in an exact match, identifying the image as a known phishy image. Similarly, if a similarity analysis of the image phash identifies a correlation with a known phishy image, the image will be assigned an image score associated with the level of similarity. If the similarity score does not exceed an image score threshold, the image will be determined to not be suspicious and processing will end. If the image score does exceed an image score threshold, the image classifier 170 will continue to process the object which may include determining if the aspect ratio (i.e. the ratio of the image width to the image height) is similar to images stored in the phishing image database. The image classifier continues the analysis process for each image associated with the object. When the image classifier 170 completes its analysis of each image associated with the object, identifying at least one suspicious and/or phishy image, the image classifier provides the determination of phishiness associated with each image (i.e. an image score) to the object classifier 180 in step 245.

In step 245 the object classifier 180 receives at least the image score associated with each image of the set of images to be used by the object classifier to generate a determination of phishiness of the object (i.e. an object score). The object is determined to be phishy when the object score of the set of images exceeds an object score threshold. In some embodiments the object score threshold may be related to a ratio of phishy image area (i.e. the product of the height and width of each image) to non-phishy image area. In other embodiments the object score threshold may be relate to a weighted average of the area and image score (i.e. the product of the image score and area of the phishy image) as a proportion of the total image area. The object score threshold may be static or dynamic, adjusting in response to updates via the communication interface 305 and/or network administrator input. If the object classifier does not determine the object is phishy, the procedure may proceed to step 260 and end. If the object classifier 180 determines the object is phishy, the determination is provided to the reporting engine 190 in step 250.

The process continues in step 250 wherein, the reporting engine 190 receives information from the object classifier 180 and generates alerts issued via the communication interface 305 that identify to an administrator (or an expert network analyst) the likelihood of a phishing cyber-attack originating from the object processed by the PDAS analysis logic. Additional information regarding the phishing object may optionally be included in the alerts. For example, additional reported information may contain, in part, the targeted domain (i.e. a website from which images of the object are similar, etc.). The targeted domain associated with the URL may indicate whether or not the webpage is genuine (i.e. if the targeted domain is consistent with the domain identified in the URL). The reporting engine 190 may also provide connected network security systems with updated information regarding phishing attacks and the associated MD5 for blocking the network traffic associated with the phishing objects. In some embodiments, if the object classifier 180 does not determine the object represents a phishing cyber-attack, the reporting engine 190 may alert a network administrator via an alert, while in alternative embodiments the reporting engine will not issue an alert. Once step 250 is complete, the generated phishing detection procedure concludes at step 260.

FIG. 3 is an exemplary embodiment of a logical representation of the phishing detection and analysis system 100 of FIG. 1. The phishing detection and analysis system 100, in an embodiment may include a housing, which is made entirely or partially of a hardened material (e.g., hardened plastic, metal, glass, composite or any combination thereof) that protects the circuitry within the housing, namely one or more processors 310 that are coupled to a communication interface 305 via a first transmission medium 307. The communication interface 305, in combination with a communication logic 320, enables communications with external network devices and/or other network appliances to receive updates for the phishing detection and analysis system 100. According to one embodiment of the disclosure, the communication interface 305 may be implemented as a physical interface including one or more ports for wired connectors. Additionally, or in the alternative, the communication interface 305 may be implemented with one or more radio units for supporting wireless communications with other electronic devices. The communication interface logic 320 may include logic for performing operations of receiving and transmitting one or more objects via the communication interface 305 to enable communication between the generated malware detection system 100 and network devices via the a network (e.g., the internet) and/or cloud computing services.

The processor(s) 310 is further coupled to a persistent storage 315 via a second transmission medium 313. According to one embodiment of the disclosure, the persistent storage 315 may include, an optional static analysis logic 105 comprising an indicator scanner 106 and/or a parsing engine 107, a dynamic analysis logic comprising one or more virtual machine(s) 120, a scheduler 130, a feature extractor 150, a feature analyzer 160, an image classifier 170, an object classifier 180, a reporting engine 190, as well as the communication interface logic 320. Of course, when implemented as hardware, one or more of these logic units could be implemented separately from each other.

In the foregoing description, the invention is described with reference to specific exemplary embodiments thereof. It will, however, be evident that various modifications and changes may be made thereto without departing from the broader spirit and scope of the invention as set forth in the appended claims.

The invention claimed is:

1. A computerized method for detecting a phishing cyber-attack, the method comprising:
   inspecting a source code of an object to detect whether the object includes an input prompt in the source code;
   extracting a plurality of images from the object if the source code of the object includes the input prompt or discontinuing analysis of the object if the source code is devoid of the input prompt;
   generating one or more properties associated with each of the plurality of images included as part of the object;
   correlating the one or more properties associated with each image of the plurality of images with one or more properties associated with images of known phishing objects to classify the object; and
   generating and issuing an alert to indicate a classification of the object as part of a phishing attack.

2. The computerized method of claim 1, wherein the inspecting of the source code includes conducting a static analysis of the object.

3. The computerized method of claim 1, wherein the input prompt includes a displayable element that prompts a user to enter data.

4. The computerized method of claim 1, wherein the object corresponds to content of a webpage that includes source code associated with the webpage.

5. The computerized method of claim 4, wherein each of the plurality of images corresponds to a graphical representation of a subset of the webpage.

6. The computerized method of claim 5, wherein the graphical representation includes one or more embedded images, the one or more embedded images include a logo.

7. The computerized method of claim 1, wherein the correlating of the one or more properties associated with each image of the plurality of images with the one or more properties associated with the images of known phishing objects comprises assigning a score based on a level of correlation between (i) each property of the one or more properties associated with the object and (ii) properties associated with images of the known phishing objects.

8. A computerized method for detecting a phishing cyber-attack, the method comprising:
   extracting a plurality of images from an object;
   generating one or more properties associated with each of the plurality of images included as part of the object;
   correlating the one or more properties associated with each image of the plurality of images with one or more properties associated with images of known phishing objects to classify the object; and
   generating and issuing an alert to indicate a classification of the object as part of a phishing attack,
   wherein the correlating of the one or more properties associated with each image of the plurality of images with the one or more properties associated with the images of known phishing objects comprises assigning a score for an image of the plurality of images extracted from the object based on a combination of scores for each of the one or more properties associated with the image.

9. The computerized method of claim 8, wherein the correlating of the one or more properties associated with each image of the plurality of images with the one or more properties associated with the images of known phishing objects further comprises assigning a score for the object based on a combination of scores assigned to the plurality of images extracted from the object.

10. The computerized method of claim 1, wherein the one or more properties associated with an image of the plurality of images comprise a cryptographic hash of the image.

11. The computerized method of claim 1, wherein the one or more properties associated with an image of the plurality of images comprise a perceptual hash of the image, the perceptual hash operates as a fingerprint of the image and is derived from features of the image.

12. The computerized method of claim 11, wherein the perceptual hash is used in determining a similarity between the image and at least one image of the known phishing objects.

13. A non-transitory persistent storage including logic that, when executed by one or more processors, is configured to detect phishing cyber-attacks, comprising:
   logic that, when in operation, conducts a static analysis of the object to inspect a source code of the object to detect whether the source code includes an input prompt and extracts a plurality of images from an object if the source code of the object includes the input prompt or discontinues subsequent analysis of the object if the source code of the object is devoid of the input prompt;
   feature analyzer logic that, when in operation, generates one or more properties associated with each of the plurality of images included as part of the object;
   classifier logic that, when in operation, correlates the one or more properties associated with each image of the plurality of images with one or more properties associated with images of known phishing objects to classify the object; and
   a reporting engine that, when in operation, generates and issues an alert to indicate a classification of the object as part of a phishing attack.

14. The non-transitory persistent storage of claim 13, wherein the input prompt includes a displayable element that prompts a user to enter data.

15. The non-transitory persistent storage of claim 13, wherein the object corresponds to content of a webpage that includes source code associated with the webpage.

16. The non-transitory persistent storage of claim 15, wherein each of the plurality of images corresponds to a graphical representation of a subset of the webpage.

17. The non-transitory persistent storage of claim 16, wherein the graphical representation includes one or more embedded images, the one or more embedded images include a logo.

18. The non-transitory persistent storage of claim 13, wherein the classifier logic is configured to attempt to correlate the one or more properties associated with each image of the plurality of images with the one or more properties associated with the images of known phishing objects by at least assigning a score based on a level of correlation between (i) each property of the one or more properties associated with the object and (ii) properties associated with images of the known phishing objects.

19. A non-transitory persistent storage including logic that, when executed by one or more processors, is configured to detect phishing cyber-attacks, comprising:
   logic that, when in operation, extracts a plurality of images from an object;
   feature analyzer logic that, when in operation, generates one or more properties associated with each of the plurality of images included as part of the object;
   classifier logic that, when in operation, correlates the one or more properties associated with each image of the plurality of images with one or more properties associated with images of known phishing objects to classify the object; and
   a reporting engine that, when in operation, generates and issues an alert to indicate a classification of the object as part of a phishing attack,
   wherein the classifier logic is configured to attempt to correlate the one or more properties associated with each image of the plurality of images with the one or more properties associated with the images of known phishing objects by at least assigning a score for an image of the plurality of images extracted from the object based on a combination of scores for each of the one or more properties associated with the image.

20. The non-transitory persistent storage of claim 19, wherein the classifier logic is configured to attempt to correlate the one or more properties associated with each image of the plurality of images with the one or more properties associated with the images of known phishing objects by at least assigning the score for the object based on a combination of scores assigned to the plurality of images extracted from the object in lieu of each of the one or more properties associated with the image.

21. The non-transitory persistent storage of claim 13, wherein the one or more properties associated with an image of the plurality of images comprise a cryptographic hash of the image.

22. The non-transitory persistent storage of claim 19, wherein the one or more properties associated with an image of the plurality of images comprise a perceptual hash of the image, the perceptual hash operates as a fingerprint of the image and is derived from features of the image.

23. The non-transitory persistent storage of claim 22, wherein the perceptual hash is used in determining a similarity between the image and at least one image of the known phishing objects.

* * * * *